United States Patent [19]

Bok

[11] Patent Number: 4,742,895

[45] Date of Patent: May 10, 1988

[54] DISK BRAKE ASSEMBLY

[75] Inventor: Lowell D. Bok, Anna, Ohio

[73] Assignee: The B. F. Goodrich Company, Akron, Ohio

[21] Appl. No.: 94,355

[22] Filed: Sep. 8, 1987

Related U.S. Application Data

[60] Continuation of Ser. No. 874,979, Jun. 16, 1986, abandoned, which is a division of Ser. No. 627,364, Jul. 2, 1964, Pat. No. 4,613,017.

[51] Int. Cl.⁴ .................. F16D 55/02; F16D 69/00
[52] U.S. Cl. ........................ 188/71.7; 188/218 XL; 188/250 B; 188/196 R; 188/71.5
[58] Field of Search .............. 188/71.5, 71.7, 73.1, 188/73.2, 240, 250, 18, 218, 251, 366–369, 196, 73.32; 244/110, 111; 192/107 R, 111, 70.13

[56] References Cited

U.S. PATENT DOCUMENTS

| | | | |
|---|---|---|---|
| 1,886,865 | 11/1932 | Bixby | 192/70.13 X |
| 3,021,932 | 2/1962 | Becknell | 192/70.13 X |
| 3,712,427 | 1/1973 | Cook et al. | 188/218 XL X |
| 4,290,505 | 9/1981 | Kramer | 188/71.5 X |

FOREIGN PATENT DOCUMENTS 2741643  3/1978  Fed. Rep. of Germany ..... 188/71.5

Primary Examiner—Douglas C. Butler
Attorney, Agent, or Firm—Joseph Januszkiewicz

[57] ABSTRACT

A disk brake in which the brake is assembled with the thickness of the available wear portions of a first group of disks being different from the thickness of the available wear portions of a second group of disks. After a predetermined number of brake applications, the first group of disks is replaced by a third group of disks. At the time of replacement, the thickness of the available wear portions of the third group of disks is greater than the thickness of the available wear portions of the second group of disks so that after another predetermined number of brake applications the second group of disks may be replaced by another group of disks. By maintaining disks of different thicknesses of the available wear portions, the piston travel is reduced and the size and weight of the brake may be reduced while at the same time the heat sink mass of the worn disks is not reduced excessively and worn brake operating temperatures are lowered.

4 Claims, 3 Drawing Sheets

DISK BRAKE ASSEMBLY

This is a continuation of application Ser. No. 874,979 filed June 16, 1986, now abandoned, which is a division of application Ser. No. 627,364, filed July 2, 1984, now U.S. Pat. No. 4,613,017.

BACKGROUND OF THE INVENTION

This invention relates to disk type brakes and especially to aircraft brakes utilizing carbon brake disks. These brakes have been assembled with the available wear portions of the stator and rotor disks having the same thickness. The brakes have then been operated until all the disks are fully worn at which time the disks are removed and refurbished or reworked to replace the available wear portions. The brakes are then reassembled with the refurbished or new disks having the same thickness of available wear portions. With this construction the heat sink mass is reduced by the total amount of wear of all the disks. This is not desirable because the heat sink mass must be above a certain level to hold the operating temperature down. The size and weight of brakes are limited on an aircraft and therefore the thickness of the available wear portions of the disks is also limited. This controls the number of landings between the refurbishing of the disks. The piston-cylinder assemblies for actuating the brakes also have a length determined by piston travel which is a function of the total wear of the disks. Where the brakes are operated until all the disks are fully worn, the piston travel is a significant factor which increases the length and, accordingly, the weight of the piston-cylinder assemblies.

SUMMARY OF THE INVENTION

According to this invention a disk brake construction is provided which is assembled with the available wear portions of the disks having different thicknesses. The brake envelope is of a minimum size to accomodate the disks. The piston-cylinder assemblies also are of a reduced size with a reduced piston travel. An intermediate overhaul is made after a predetermined number of landings and a portion of the disks replaced by new or refurbished disks. In this way, the piston travel is reduced and the size and weight of the brake may be reduced while at the same time a substantial portion of the heat sink mass of the worn brake is retained to lower the operating temperatures.

In accordance with one aspect of the invention there is provided a disk brake comprising a plurality of disks, the disks having available wear portions of predetermined different thicknesses, a first group of the disks having the available wear portions of a first thickness in overlapping relationship with a second group of the disks having the available wear portions of a second thickness, the first thickness of the available wear portions of the first group of the disks being less than the second thickness of the available wear portions of the second group of the disks so that after a predetermined number of brake applications the available wear portions of the first group of the disks are substantially fully worn away at an intermediate overhaul time and the available wear portions of the second group of the disks are not worn away, the first group of the disks being replaceable by a third group of the disks having available wear portions of a third thickness and the third thickness being greater then the thickness of the available wear portions of the second group of the disks at the intermediate overhaul time.

In accordance with another aspect of the invention there is provided a method of assembling a disk brake having a plurality of disks with available wear portions of predetermined different thicknesses comprising positioning a first group of the disks in overlapping relationship with a second group of the disks, the first group of the disks having each of the available wear portions of a first thickness, the second group of the disks having each of the available wear portions of a second thickness, the first thickness of each of the available wear portions of the first group of the disks being less than the second thickness of each of the available wear portions of the second group of the disks, replacing the first group of the disks with a third group of the disks at an intermediate overhaul time when the available wear portions of the first group are substantially fully worn, the available wear portions of each of the third group of the disks having a third thickness greater than the thickness of each of the available wear portions of the second group of the disks at the intermediate overhaul time.

The accompanying drawings show one preferred form and a modification made in accordance with and embodying this invention and are representative of how this invention may be practiced.

DETAILED DESCRIPTION

Figure 1:
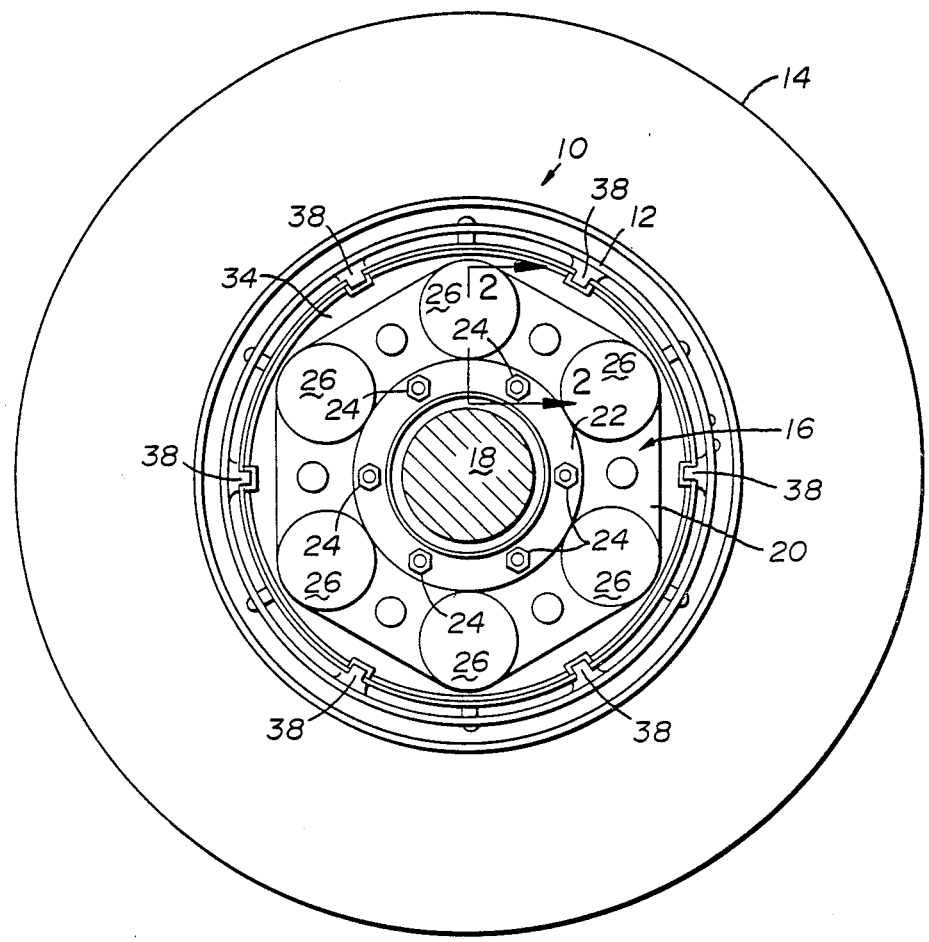
FIG. 1 is an axial elevational view of a tire and rim assembly showing the wheel and brake from the axle mounting side.

Referring to FIG. 1, a wheel and brake assembly 10 is shown in which a rim 12 supports a tire 14. The wheel and brake assembly 10 is of a type used for an aircraft and may have a prior art disk brake 16 positioned between the rim 12 and a stationary axle 18.

The disk brake 16 includes a torque frame 20 which may be fastened to a torque flange 22 mounted on the axle 18 by bolts and nuts 24. Hydraulic piston-cylinder assemblies 26 are supported on the torque frame 20 at circumferentially spaced-apart positions around the axle 18. A torque tube 28 is mounted on the torque frame 20 and has axially extending splines 30 for sliding engagement in slots (not shown) in a first group of disks such as stators 32 and end plates 34. Positioned between the stators 32 is a second group of disks such as rotors 36 having slots for sliding engagement with axially extending lugs 38 (shown in FIG. 1) mounted on the rim 12. Pistons 40 of the piston-cylinder assemblies 26 engage one of the end plates 34 and a caliper member 42 attached to the torque tube 28 for engagement with the other of the end plates 34.

Figure 2:
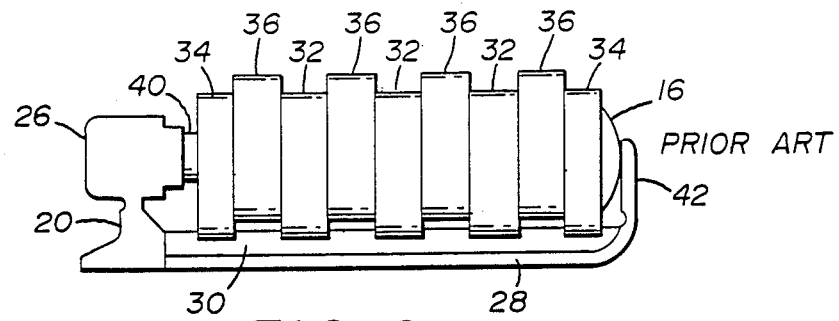
FIG. 2 is a fragmentary schematic sectional view taken along the line 2—2 in FIG. 1, showing a prior art heat sink brake with new unworn disks.
Figure 3:
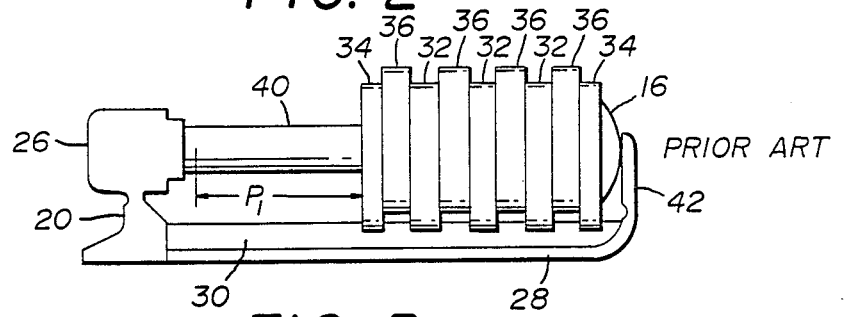
FIG. 3 is a view like FIG. 2 showing the disks in the fully worn condition.
Figure 4:
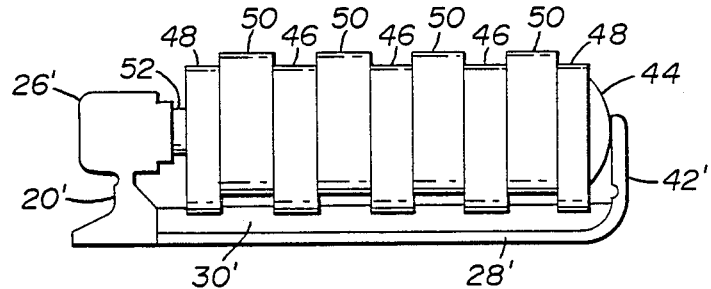
FIG. 4 is a view like FIG. 2 showing a brake with the same size brake envelope, but with disks assembled in accordance with the method and construction of this invention.
Figure 5:
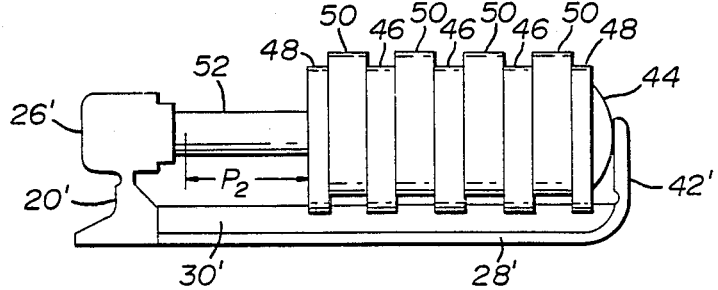
FIG. 5 is a view like FIG. 3 showing the brake of FIG. 4 at the intermediate overhaul time ready for replacement of one group of fully worn disks.

The prior art disk brake 16, shown in FIGS. 2 and 3, has the same length brake envelope as disk brake 44 embodying the invention and shown in FIGS. 4 and 5. Those parts which are the same in disk brake 44 as in the prior art disk brake 16 will be given the same numerals with a single prime symbol to indicate they are the same. Those parts in the disk brake 44 embodying the invention which are similar but are not the same as the parts in the prior art disk brake 16 will be identified by new numbers. Referring to FIGS. 4 and 5 the first group of disks such as stators 46 and end plates 48 have slots for slidable engagement on the splines 30′. A second group of disks, such as rotors 50, are positioned between the stators 46 and are slidably mounted on lugs 38′. A piston 52 of one of the piston cylinder-assemblies 26′ engages one of the end plates 48 and caliper member 42′ engages the other of the end plates 48.

Referring to the prior art construction of FIG. 2, the stators 32 and end plates 34 may be carbon brake disks having a total thickness of approximately 1.6 inches (4.06 cm) with an available wear portion on each side (or on one side of the end plates 34) having a thickness of about 0.30 inches (0.76 cm). The rotors 36 may also be of a similar construction and thickness. During operation of the prior art disk brake 16 brake applications are made at each landing of the aircraft until all the available wear portions are worn off the stators 32, end plates 34 and rotors 36 at which time the piston 40 has a piston travel $P_1$ as shown in FIG. 3. The heat sink mass of the unworn stators 32, end plates 34 and rotors 36 shown in FIG. 2 is 100 pounds (45.4 kg), whereas the heat sink mass of the fully worn stators 32, end plates 34 and rotors 36, shown in FIG. 3, is 60 pounds (27.24 kg). This represents a loss of 40 pounds (18.16 kg) in heat sink mass.

Referring to the brake 44 embodying the invention shown in FIGS. 4 and 5, the second group of disks or rotors 50 are carbon brake disks having a total thickness of 1.8 inches (4.47 cm) with an available wear portion of 0.40 inches (1.02 cm) on each side of the unworn disks. The end plates 48 and stators 46 are carbon brake disks like the rotors 50, except that the available wear portions are partially worn and may be one-half worn with a thickness of 0.2 inches (0.51 cm).

Referring to FIG. 5, the brake 44 is shown at an intermediate overhaul time after a predetermined number of brake applications or landings. The available wear portions of the end plates 48 and stators 46 have been substantially fully worn away and the available wear portions of the rotors 50 have been partially worn and may be one-half worn. The piston travel $P_2$, as shown in FIG. 5, is less than the piston travel $P_1$ and may be two-thirds the piston travel $P_1$ of the prior art brake 16 shown in FIGS. 2 and 3.

In a preferred embodiment of the brake 44, shown in FIGS. 4 and 5, the first thickness of the available wear portions of the end plates 48 and stators 46 is one-half the thickness of the available wear portions of the rotors 50. Also, the heat sink mass of the stators 46, end plate 48 and rotors 50, shown in FIG. 4, is 100 pounds (45.4 kg) whereas the heat sink mass of the same disks in FIG. 5 at the intermediate brake overhaul time is 73⅓ pounds (33.29 kg) which represents a loss of 26⅔ pounds (12.11 kg) with a disk brake 44 having the same brake envelope as the prior art disk brake 16.

In accordance with this invention the fully worn stators 46 and end plates 48, shown in FIG. 5, are replaced at the intermediate brake overhaul time by new or refurbished stators and end plates with each of the available wear portions having a thickness of 0.4 inches (1.02 cm). In the embodiment shown in FIGS. 4 and 5, the intermediate brake overhaul time is after 2,000 landings and the stators 46, end plates 48 and rotors 50 are also refurbished after 4,000 landings after each brake overhaul time. This compares with the prior art brake 16 of FIGS. 2 and 3 where the brake is overhauled at 3,000 landings and the stators 32, end plates 34 and rotors 36 are refurbished after 3,000 landings.

It can therefore be seen that with the method and apparatus of the disk brake 44 of this invention shown in FIGS. 4 and 5, the number of landings provided by each of the disks is increased by 33⅓% from 3,000 to 4,000. The heat sink mass is maintained at 73⅓ pounds, (33.29 kg) an increase of 13⅓ pounds (6.04 kg) over the worn heat sink mass of the prior art brake 16, shown in FIG. 3, and the piston travel $P_2$ is reduced by one third. This is all done with the method and apparatus of this invention within the same brake envelope and with only the extra operation of replacing worn disks at an intermediate overhaul time after 2,000 landings.

Figure 6:
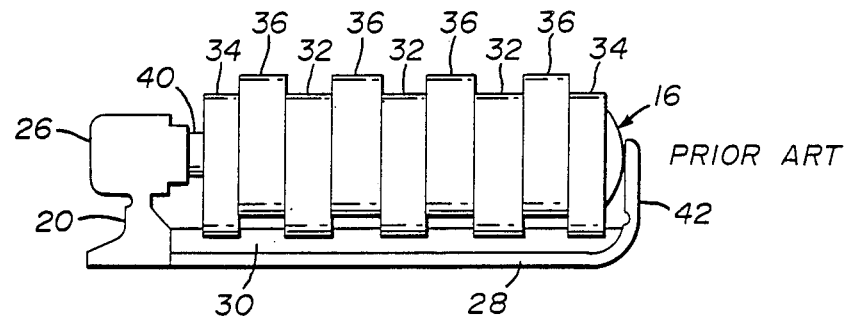
FIG. 6 is a view identical to FIG. 2 showing a prior art brake with the unworn disks mounted in the brake envelope.
Figure 7:
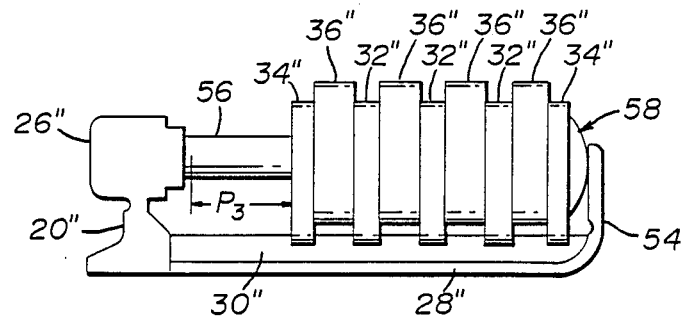
FIG. 7 is a view like FIG. 5 of a modification embodying the invention having a shorter brake envelope and being in condition for replacing the fully worn disks with refurbished or unworn disks at an intermediate overhaul time.
Figure 8:
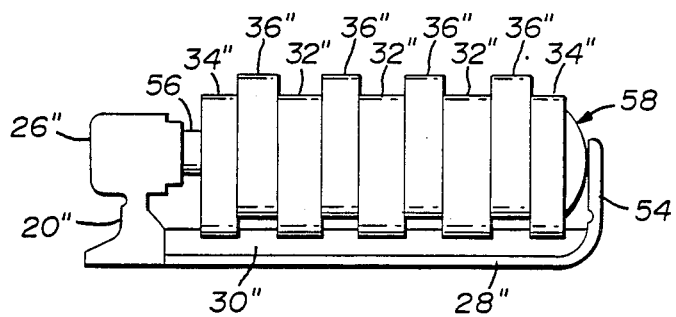
FIG. 8 is a view like FIG. 7 showing the brake after the fully worn disks have been replaced with the unworn disks.

The prior art brake 16 is shown again in FIG. 6 on the same page with FIGS. 7 and 8 showing the first modification of the present invention to illustrate the difference in the length of the brake envelope between the caliper 42 and the piston 40 in FIG. 6, and the length of the brake envelope shown in FIG. 8 between the caliper 54 and the piston 56. In FIGS. 7 and 8, a modified disk brake 58 is shown with the parts that are the same as the parts of the prior art disk brake 16 indicated by the same number and a double prime symbol.

Referring to FIG. 7, the brake 58 is shown after a predetermined number of landings at the intermediate overhaul time, which in this case is one-half the landings for the prior art brake 16 shown in FIG. 6. The stators 32″ and end plates 34″ have substantially fully worn available wear portions and the rotors 36″ have available wear portions which are one-half worn. The piston throw $P_3$ is one-half the piston throw $P_1$ of the brake 16 shown in FIG. 3. The heat sink mass is 70 pounds (31.78 kg) as compared to 60 pounds (27.24 kg) in the brake 16 shown in FIG. 3.

At the intermediate overhaul time of the brake 58, illustrated in FIG. 7, the stators 32″ and end plates 34″ are replaced by new or refurbished disks with unworn available wear portions. Referring to FIG. 8, the rotors 36″ have available wear portions with a thickness which is one-half the thickness of the unworn wear portions of the stators 32″ and end plates 34″. Also, the heat sink mass of the disks, shown in FIG. 8, is 90 pounds (40.86 kg) which is only 10 pounds (4.54 kg) less than the heat sink mass of the disks of the prior art brake 16, shown in FIG. 6. With the prior art brake 16, the loss in heat sink mass is 40 pounds (18.16 kg) as opposed to only 20 pounds (9.08 kg) with the brake 58 in the condition shown in FIG. 7. The piston travel $P_3$ of the brake 58 is one-half of the piston travel $P_1$ of the prior art brake 16, shown in FIG. 6. This reduction in piston travel plus the reduction in length of the brake envelope decreases the weight of the brake and the space required for the brake. The disks of the brake 58 are usable for 3,000 landings before refurbishment is necessary and the number of landings between intermediate brake overhaul times is maintained at 1500.

In the operation of the brakes 44 and 58, shown in FIGS. 4, 5, 7 and 8, the same method may be followed. A summary of that method is set forth for the embodiment of FIGS. 4 and 5, but applies to the embodiment of FIGS. 7 and 8 as well. Referring to FIG. 4, the brake 44 has been assembled by positioning a first group, such as stators 46 and end plates 48 in overlapping relationship with a second group of disks such as rotors 50. The stators 46 and end plates 48 have available wear portions of a first thickness which is less than and preferably one-half the second thickness of the available wear portions of the rotors 50. After a predetermined number of brake applications or landings the available wear portions of the stators 46 and end plates 48 will be substantially fully worn and these are then replaced by a third group of disks such as new or refurbished stators and end plates which have available wear portions with a third thickness greater than and preferably double the thickness of the available wear portions of the rotors 50 at the intermediate overhaul time. The brake 44 is then operated for a predetermined number of brake applications or landings to another intermediate overhaul time when the available wear portions of the rotors 50 will be fully worn and will be replaced by new or refurbished rotors to obtain the condition shown in FIG. 4. The fully worn stators 46, end plates 48 and rotors 50 are refurbished after being removed from the brakes. They are then ready to be installed in a brake where they provide a full disk life of landings.

In addition to the method and apparatus shown and described with relation to FIGS. 4, 5, 7 and 8, it is understood that other modifications may be provided in which the thicknesses of the available wear portions of the brake disk are varied to obtain the advantages provided by the above described embodiments.

I claim:

1. A disk brake assembly comrpising a first group of brake disks and a second group of brake disks in axially aligned and interleaved relationship, said disks of said first group being interleaved with said disks of said second group in alternating relationship, each of said disks of said first group and said second group having oppositely disposed wear surfaces, said first group of said disks having a first thickness, said second group of said disks having a second thickness, said first thickness of said first group of said disks being substantially less than said second thickness of said second group of said disks whereby after a predetermined number of brake applications the available wear portions of said first group of said disks are substantially fully worn away at an intermediate overhaul time and the available wear portions of said second group of said disks are not worn away wherein both sides of each of said disks of said first group have available wear portions which are one-half worn compared to the available wear portions of said second group, and both sides of each of said disks of said second group have available wear portions which are not worn whereby said first thickness of said first group of disks is one-half said second thickness of said second group of disks.

2. A disk brake assembly comprising a first group of brake disks and a second group of brake disks in axially aligned and interleaved relationship, said disks of said first group being interleaved with said disks of said second group in alternating relationship, each of said disks of said first group and said second group having oppositely disposed wear surfaces, said wear surfaces on opposite sides of each brake disk of said first group are equal in thickness, said wear surfaces on opposite sides of each brake disk of said second group are equal in thickness, said wear surfaces of said first group of said disks having a first thickness, said wear surfaces of said second group of said disks having a second thickness, said first thickness of said first group of said disks being less than said second thickness of said second group of said disks whereby after a predetermined number of brake applications the available wear thickness of said first group of said disks are substantially fully worn away at an intermediate overhaul time and said available wear thickness of said second group of said disks are not worn away.

3. A disk brake assembly as set forth in claim 2 wherein both sides of each of said disks of said first group have available wear thicknesses which are one-half worn compared to the available wear thickness of said second group, and both sides of each of said disks of said second group have available wear thicknesses which are not worn whereby said first thickness of said first group of disks is one-half said second thickness of said second group of disks.

4. A disk brake assembly as set forth in claim 3 whereby all of said disks of said first group and said second group are positioed in an envelope space within said disk brake assembly, said brake assembly having a piston cylinder means with an extensible piston for urging said disks together to provide braking, and said piston having a maximum piston travel relative to said cylinder that is a distance equal to the sum of all of said first thicknesses of said first group of said disks and one-half of all of said second thicknesses of said second group.

* * * * *